(12) United States Patent
Caulier

(10) Patent No.: US 10,113,867 B2
(45) Date of Patent: Oct. 30, 2018

(54) DEVICE AND METHOD FOR THREE-DIMENSIONAL RECONSTRUCTION OF A SCENE BY IMAGE ANALYSIS

(71) Applicant: AREVA NP, Courbevoie (FR)

(72) Inventor: Yannick Caulier, Chalon sur Saone (FR)

(73) Assignee: AREVA NP, Courbevoie (FR)

( * ) Notice: Subject to any disclaimer, the term of this patent is extended or adjusted under 35 U.S.C. 154(b) by 0 days.

(21) Appl. No.: 15/308,944

(22) PCT Filed: May 6, 2015

(86) PCT No.: PCT/EP2015/059994
§ 371 (c)(1),
(2) Date: Nov. 4, 2016

(87) PCT Pub. No.: WO2015/169873
PCT Pub. Date: Nov. 12, 2015

(65) Prior Publication Data
US 2017/0076458 A1 Mar. 16, 2017

(30) Foreign Application Priority Data

May 7, 2014 (FR) ..................................... 14 54153

(51) Int. Cl.
*G06T 7/00* (2017.01)
*G01B 11/30* (2006.01)
(Continued)

(52) U.S. Cl.
CPC ........ *G01B 11/303* (2013.01); *G01B 11/0608* (2013.01); *G01B 11/2531* (2013.01);
(Continued)

(58) Field of Classification Search
CPC ..... G06T 7/521; G06T 7/571; G01B 11/2531; G01B 11/2536; G01B 11/25;
(Continued)

(56) References Cited

U.S. PATENT DOCUMENTS

| 8,340,456 B1* | 12/2012 | DaneshPanah | .... H04N 5/23219 382/255 |
| 2010/0201811 A1* | 8/2010 | Garcia | ............... G01B 11/2513 348/136 |
| 2012/0133954 A1* | 5/2012 | Takabayashi | ...... G01B 11/2536 356/610 |

FOREIGN PATENT DOCUMENTS

FR 2292213 6/1976

OTHER PUBLICATIONS

Search Report of corresponding PCT International Application.

* cited by examiner

*Primary Examiner* — Kim Vu
*Assistant Examiner* — Michael Vanchy, Jr.
(74) *Attorney, Agent, or Firm* — Davidson, Davidson & Kappel, LLC

(57) ABSTRACT

A device and method for three-dimensional reconstruction of a scene by image analysis is provided. This device comprises an image acquisition device to capture images of the scene, an analysis device to calculate a three-dimensional reconstruction of the scene from at least one image of the scene taken by the image acquisition device, and a projection device to project a first light pattern and a second light pattern, which are complementary, on the examined scene, the first light pattern and the second light pattern being projected along separate projection axes forming a non-zero angle between them, so as to be superimposed while forming a uniform image with homogenous intensity in a projection plane.

11 Claims, 2 Drawing Sheets

(51) Int. Cl.
 *G01B 11/25* (2006.01)
 *G01B 11/06* (2006.01)
 *G02B 7/36* (2006.01)
 *G02B 15/12* (2006.01)
 *G06T 7/521* (2017.01)
 *G06T 7/571* (2017.01)
(52) U.S. Cl.
 CPC .............. *G02B 7/36* (2013.01); *G02B 15/12* (2013.01); *G06T 7/521* (2017.01); *G06T 7/571* (2017.01); *G06T 2207/10016* (2013.01)
(58) Field of Classification Search
 CPC ............ G01B 11/2513; G01B 11/2545; G01B 11/254; G02B 7/36; H04N 9/3147; H04N 13/0207; G03B 37/04
 See application file for complete search history.

DEVICE AND METHOD FOR THREE-DIMENSIONAL RECONSTRUCTION OF A SCENE BY IMAGE ANALYSIS

The present invention relates to the field of the three-dimensional reconstruction of scenes from one or several images of the scene taken using an image capture device and analysis of the images taken using an image analysis device.

The three-dimensional reconstruction of a scene by image analysis is applicable in industry, in particular to determine the three-dimensional relief of a part or of a surface situated in a difficult-to-access location, for example in a nuclear reactor, in particular in a steam generator of the nuclear reactor. It in particular makes it possible to monitor the surface condition of a weld seam done between two parts, or to measure the roughness of a surface.

On an image taken by an image acquisition device, elements situated in a sharp zone appear sharp, while elements situated outside the sharp zone appear fuzzy. The sharp zone is a section of the space comprised between a sharp front plane and a sharp rear plane, parallel and separated by a distance called depth of field. The sharp front plane and the sharp rear plane are situated on either side of a maximum sharpness plane.

It is possible to determine a three-dimensional reconstruction of a scene by analyzing the optical unsharpness in an image.

BACKGROUND

In a three-dimensional reconstruction method called DFF (Depth From Focus), several images of a scene are taken with an image acquisition device, each time shifting the maximum sharpness plane along the image acquisition axis between the images, without moving the elements of the scene between the image acquisitions. By next combining the sharp regions of the different captured images, it is possible to reconstruct the three-dimensional relief of the scene, plane by plane.

In another three-dimensional reconstruction method called DFD (Depth From Defocus), the relief of the scene is reconstructed by analysis of the optical unsharpness level in the images. In each image, the higher the unsharpness level of a zone is, the more it is shifted depthwise relative to the sharpness zone. By knowing the optical parameters of the image acquisition device, it is possible to determine the depth of the point of the scene associated with each pixel of the image.

The optical unsharpness level in an image is for example measured by measuring the contrast in the image. A low contrast indicates a fuzzy region of the image, while a high contrast indicates a sharp region of the image.

It is possible to project a textured light pattern on the scene that increases the contrast to improve the precision of the analysis of the optical unsharpness in the captured images. The light pattern for example comprises parallel lines, fringes or a checkerboard.

Nevertheless, this is not fully satisfactory in terms of precision, for example for the three-dimensional reconstruction of surfaces with a low roughness.

SUMMARY OF THE INVENTION

One of the aims of the present invention is to propose a device for the three-dimensional reconstruction of a scene by analyzing images taken using an image acquisition device, that is easy to use and has a satisfactory precision.

To that end, the invention provides a device for the three-dimensional reconstruction of a scene by image analysis, comprising an image acquisition device to capture images of the scene, an analysis device to calculate a three-dimensional reconstruction of the scene from at least one image of the scene taken by the image acquisition device, and a projection device to project a first light pattern and a second light pattern, which are complementary, on the examined scene, the first light pattern and the second light pattern being projected along separate projection axes forming a non-zero angle between them, so as to be superimposed while forming a uniform image with homogenous intensity in a projection plane.

The three-dimensional reconstruction device may comprise the following optional features, considered alone or in combination:
  the first light pattern and the second light pattern each comprise light zones and dark zones forming a geometric pattern, in particular light fringes;
  the analysis device is programmed to calculate a three-dimensional reconstruction from a measurement of the variation in the homogeneity and light intensity in each image of the scene;
  the analysis device is programmed to calculate, from at least one image of the scene, the position of each point of the scene relative to the projection plane and/or to calculate, from at least one captured image, a measurement of the depth of each point of the scene as a function of the variation of the homogeneity of the intensity between the different points of the scene;
  the reconstruction device is programmed to capture a series of images of the scene by moving the maximum sharpness plane of the image acquisition device relative to the scene between each shot, the analysis device being programmed to calculate a three-dimensional reconstruction of the scene, plane by plane, from the series of images.

The invention also provides a method for three-dimensional reconstruction of a scene by image analysis, comprising the following steps:
  projecting a first light pattern and a second light pattern, which are complementary, on the examined scene, the first light pattern and the second light pattern being projected along separate projection axes forming a non-zero angle between them, so as to be superimposed while forming a uniform projected image with homogenous intensity in a projection plane;
  capturing at least one image of the examined scene; then
  calculating a three-dimensional reconstruction of the scene by analysis of the captured image.

The three-dimensional reconstruction method may comprise the following optional features, considered alone or in combination:
  the first pattern and the second pattern each comprise light zones and dark zones forming a geometric pattern, in particular light fringes;
  the analysis device is programmed to calculate a three-dimensional reconstruction from a measurement of the variation in the homogeneity and light intensity in each image of the scene;
  the step for calculating a three-dimensional reconstruction comprises calculating, from at least one image of the scene, the position of each point of the scene relative to the projection plane and/or calculating, from at least one captured image, a measurement of the depth of each point of the scene as a function of the variation of the homogeneity of the intensity between the different points of the scene;

the image acquisition step comprises capturing a series of images of the scene by moving the maximum sharpness plane of the image acquisition device relative to the scene between each shot, the step for calculating a three-dimensional reconstruction comprising calculating the three-dimensional reconstruction of the scene, plane by plane, from the series of images.

BRIEF SUMMARY OF THE DRAWINGS

The invention and its advantages will be better understood upon reading the following description, provided solely as an example, and done in reference to the appended drawings, in which.

DETAILED DESCRIPTION

Figure 1:
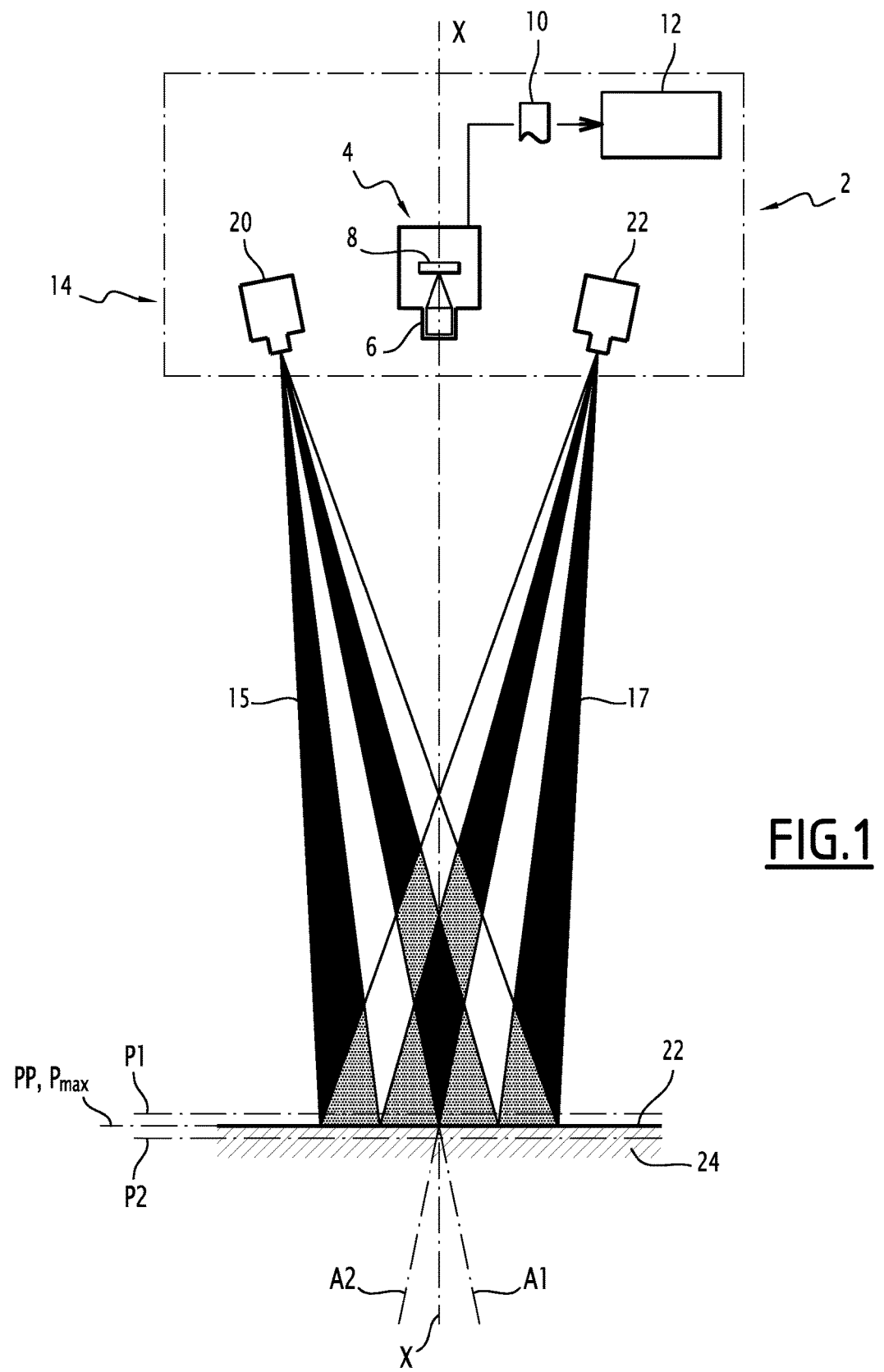
FIG. 1 is a diagrammatic front view of a device for the three-dimensional reconstruction of a scene by image analysis.

The three-dimensional reconstruction device 2 of FIG. 1 is suitable for reconstructing the three-dimensional relief of a scene by image analysis of the scene.

The three-dimensional reconstruction device 2 comprises a digital image acquisition device 4, for example a digital photographic apparatus or a digital camera, for taking digital images of the scene.

The image acquisition device 4 comprises an objective 6 for focusing the light of the scene on a matricial sensor 8. The sensor 8 lit by the light of the scene captures a matricial image 10 of the scene. The matricial image 10 is formed by a matrix of pixels, each pixel having associated parameters (light intensity for each elementary color for a color image or gray level for a black and white image). Each pixel of the image corresponds to a point of the scene.

The image acquisition device 4 has an image acquisition axis X, corresponding to the optical axis of its objective 6.

The image acquisition device 4 has a maximum sharpness plane Pmax contained in a sharpness zone that is a section of the space defined between a sharp front planeP1 and a sharp rear planeP2 situated on either side of the maximum sharpness plane Pmax.

The maximum sharpness plane Pmax, the sharp front planeP1 and the sharp rear planeP2 are perpendicular to the image acquisition axis X and parallel to one another. The distance between the sharp front planeP1 and the sharp rear planeP2 along the image acquisition axis X is the depth of field.

The image acquisition device 4 takes images in which the elements of the scene included in the sharpness zone are sharp and the elements of the scene outside the sharpness zone are fuzzy.

The distance from the maximum sharpness plane Pmax to the image acquisition device 4 and the depth of field depend on parameters of the image acquisition device 4 (focal length, T-stop, etc.). The parameters of the image acquisition device 4 are adjustable or fixed.

Preferably, for the three-dimensional reconstruction, the parameters of the image acquisition device 4 are chosen or adjusted such that the depth of field is low, for example lower than the depth of the scene to be reconstructed. As an example, tests have shown that it is possible to reconstruct, with a depth resolution of ¹⁄₁₀ mm, a scene with a depth of about 40 mm with a depth of field of about 20 mm. Higher depths of field may also be considered, if the texture of the surface makes it possible to determine the maximum of the contrast curve.

The image acquisition device 4 comprises an electronic analysis device 12 able to analyze the images captured by the image acquisition device 4 to perform a three-dimensional reconstruction of the scene by analysis of the captured images.

The analysis device 12 comprises a processor and a memory in which a computer application is stored containing software instructions executable by the processor to automatically calculate a three-dimensional reconstruction of the scene by image analysis.

The three-dimensional reconstruction device 2 comprises a projection device 14 for projecting, on the scene, a first light pattern 16 and a second light pattern 18, which are textured and complementary, projected so as to form sharp elementary images in a projection plane PP situated in the sharpness zone of the image acquisition device 4, so as to form a uniform combined image in the projection plane PP.

Preferably, as illustrated, the projection plane PP is substantially combined with the maximum sharpness plane Pmax.

The projection device 14 is configured to project a first projection light beam 15 of the first light pattern 16 and a second projection light beam 17 of the second light pattern 18 respectively along a first projection axis A1 and a second projection axis A2 forming a non-zero angle between them. The first beam 15 and the second beam 17 intersect.

At least one projection axis A1, A2 is separate from the image acquisition axis X and forms a non-zero angle with the latter. In the illustrated example, each projection axis A1, A2 is separate from the image acquisition axis X and forms a non-zero angle with the latter. The image acquisition axis X here forms the bisector between the projection axes A1, A2. The projection axes A1, A2 are concurrent with the image acquisition axis X.

As illustrated in FIG. 1, the projection device 14 comprises a first projector 20 for projecting the first light pattern 16 and a second projector 22 for projecting the second light pattern 18.

Figure 2:
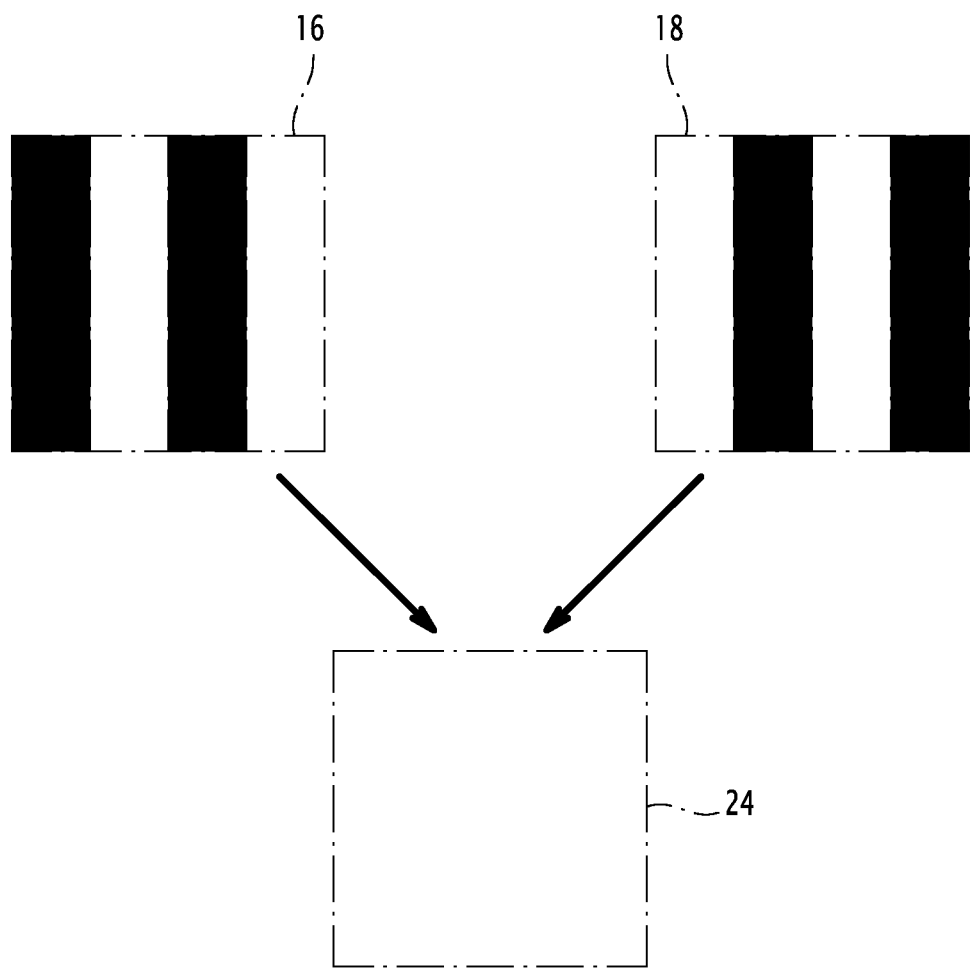
FIG. 2 is a diagrammatic illustration of light patterns projected by the three-dimensional reconstruction device, before and after superposition.

As illustrated in FIG. 2, each light pattern 16, 18 is textured, and has light zones and dark zones. The light patterns 16 and 18 here are each formed by light fringes, i.e., a plurality of alternating light and dark parallel rectilinear bands. The light patterns 16, 18 here are black and white.

The light patterns 16, 18 are complementary, such that by superimposing them in the projection plane PP in which the light patterns are sharp, a uniform combined image 24 results with a homogenous light intensity. The complementary light patterns 16, 18 are superimposed such that a dark zone of one light pattern is superimposed on a light zone of the other light pattern.

Due to the non-zero angle between the projection axes A1, A2, once a point of the scene is situated outside the projection plane, it is situated, based on its position and its depth:

in an intermediate light intensity zone, corresponding to the intersection of a dark zone of one of the light patterns 16, 18 with a light zone of the other of the light patterns 16, 18, and where the light patterns are not sharp and the light intensity is decreased;

in a high light intensity zone, corresponding to the intersection of two light zones of the light patterns 16, 18 and where the light intensity is higher than in the projection plane PP; and/or in a low light intensity zone, corresponding to the intersection of two dark zones of the two light patterns 16, 18 and where the light intensity is lower than in the projection plane PP.

The light intensity of a point of the scene situated outside the projection plane PP is different (lower or higher) from that of a point of the scene situated in the projection plane PP. The light intensity of each pixel of an image taken by the image device 4 is therefore indicative of the depth of the corresponding point of the scene.

The homogeneity of the intensity in the image varies based on the depth of the scene. The further a region of the scene is from the projection plane, the lower the homogeneity of the intensity in a corresponding zone of the image is. The closer a region of the scene is to the projection plane, the higher the homogeneity of the intensity in a corresponding zone of the image is.

The image analysis device 12 is programmed to scan each image taken by the image device 4 so as to detect the intensity homogeneity variations, in order to determine the position of the points of the scene relative to the projection plane and/or to measure the depth of the points of the scene corresponding to each pixel. This makes it possible to calculate a three-dimensional reconstruction of the scene.

In one embodiment, the image acquisition device 4 provides black-and-white images. A black-and-white image associates a gray level with each pixel, representative of the light intensity of that pixel. In this case, the image analysis device 12 is programmed to analyze the light intensity in such an image by basing itself on the gray level of the image.

In one embodiment, the image acquisition device 4 provides color images. A color image comprises three intensity images each associated with a respective color associating a light intensity in that color with each pixel of the image. The three colors are for example the three elementary colors (green, yellow, blue). In this case, the image analysis device 12 is programmed to analyze the light intensity in a captured image by analyzing the light intensity in each of the three intensity images, then combining the analyses, for example by adding up the light intensities of the three intensity images for each pixel.

The image analysis device 12 for example provides, as output, a three-dimensional reconstruction in the form of a depth map of the scene, which associates a depth with each pixel of an image of the scene taken by the image acquisition device.

The image analysis device 12 is programmed to calculate a three-dimensional reconstruction of the scene based on the depth associated with each point of the scene.

In one embodiment, the three-dimensional reconstruction device 2 is programmed to take a series of images of the scene by jointly shifting the maximum sharpness plane Pmax and the projection plane PP between each shot, the image analysis device 12 being programmed to calculate the three-dimensional reconstruction of the scene plane by plane, for example by determining, for each image, the sharp elements situated in the projection plane PP. To shift the maximum sharpness plane Pmax and the projection plane PP, the image acquisition device 4 is adjustable and/or movable along its image acquisition axis X, and/or the projection device 14 is adjustable and/or movable along the image acquisition axis X.

In one embodiment, the image analysis device 12 is programmed to calculate the position of each point of the scene relative to the projection plane PP, for example based on a sharpness variation of the point between images of a series of images taken by shifting the projection plane PP (and jointly, the maximum sharpness plane) between shots. If the sharpness of a point of the scene increases between two shots, the projection plane PP has moved closer to that point of the scene. If the sharpness of a point of the scene decreases between two shots, the projection plane PP has moved further away from that point of the scene. The position of the point of the scene is deduced from the sharpness variation of that point of the scene and the movement direction of the projection plane PP between shots.

In one embodiment, the image analysis device 12 is programmed to determine a three-dimensional reconstruction of the scene based on the position of the points of the scene relative to the projection plane PP, for example determined from a sharpness variation of the point in a series of images (e.g., two images) between which the projection plane PP (and jointly, the maximum sharpness plane Pmax) has been shifted, and based on the depth of each point of the scene determined from a detection of the intensity homogeneity variations in at least one image.

The scene here is formed by a surface 22 of an object 24 that one wishes to examine.

During operation, the object 24 is arranged in the field of view of the image acquisition device 4, the surface 22 to be examined being oriented toward the image acquisition device 4. The projection device 14 projects the light patterns 16, 18 on the surface 22 to be examined. The light patterns 16, 18 are superimposed in the projection plane PP situated in the sharpness zone P1-P2 of the image acquisition device 4 by forming lighting with a homogenous light intensity in the projection plane PP. The image acquisition device 4 takes at least one image 10 of the scene and provides the image to the analysis device 12, which reconstructs the scene in three dimensions from the or each image, for example by calculating a depth for each pixel of an image taken by the image acquisition device 4.

Owing to three-dimensional reconstruction device 2, it is possible to perform a three-dimensional reconstruction of a scene with satisfactory precision. In particular, it is possible to reconstruct a surface having a low roughness in three dimensions.

Indeed, the measurement of the depth by analyzing the optical unsharpness in an image is generally based on a contrast measurement, which is a relative measurement. To measure the roughness of a surface, the unsharpness level measured in an image of the surface thus depends on the roughness of the surface, and if a surface has a low roughness, the unsharpness level differences are small between the regions of the image and the measuring precision is low.

Conversely, projecting superimposed complementary light patterns makes it possible to implement a depth measurement based on the variation of the homogeneity of the intensity that does not depend on the overall roughness of the surface, and that allows a precise depth measurement, even for a surface with a low roughness.

What is claimed is:

1. A device for the three-dimensional reconstruction of a scene by image analysis, comprising:
   an image acquisition device configured to capture images of the scene;
   an analysis device configured to calculate a three-dimensional reconstruction of the scene from at least one image of the scene taken by the image acquisition device; and a projection device configured to project a first light pattern and a second light pattern, which are complementary, on the examined scene, the first light pattern and the second light pattern being projected along separate projection axes forming a non-zero angle between the projection axes, so as to be superimposed while forming a uniform image with homogenous intensity in a projection plane, the analysis device being programmed to calculate a three-dimensional reconstruction from a measurement of the variation in the homogeneity of light intensity in each image of the scene.

2. The three-dimensional reconstruction device according to claim 1, wherein the first light pattern and the second light pattern each comprise light zones and dark zones forming a geometric pattern.

3. The three-dimensional reconstruction device according to claim 2, wherein the first light pattern and the second light pattern each comprise light fringes.

4. The three-dimensional reconstruction device according to claim 1, wherein the analysis device is programmed to calculate, from at least one image of the scene, the position of each point of the scene relative to the projection plane and/or to calculate, from at least one image of the scene, a measurement of the depth of each point of the scene as a function of the variation of the homogeneity of the intensity between the different points of the scene.

5. The three-dimensional reconstruction device according to claim 1, programmed to capture a series of images of the scene by moving the maximum sharpness plane of the image acquisition device relative to the scene between each shot, the analysis device being programmed to calculate a three-dimensional reconstruction of the scene, plane by plane, from the series of images.

6. A method for three-dimensional reconstruction of an examined scene by image analysis, comprising the following steps:
projecting a first light pattern and a second light pattern, which are complementary, on the examined scene, the first light pattern and the second light pattern being projected along separate projection axes forming a non-zero angle between them, so as to be superimposed while forming a uniform projected image with homogenous intensity in a projection plane;
capturing at least one image of the examined scene; and then
calculating a three-dimensional reconstruction of the scene by analysis of the captured image, the three-dimensional reconstruction being calculated from a measurement of the variation in the homogeneity of light intensity in each image of the scene.

7. The three-dimensional reconstruction method according to claim 6, wherein the first pattern and the second pattern each comprise light zones and dark zones forming a geometric pattern.

8. The three-dimensional reconstruction method according to claim 7, wherein the first light pattern and the second light pattern each comprise light fringes.

9. The three-dimensional reconstruction method according to claim 6, wherein the step for calculating a three-dimensional reconstruction comprises calculating, from at least one image of the scene, the position of each point of the scene relative to the projection plane and/or calculating, from at least one captured image, a measurement of the depth of each point of the scene as a function of the variation of the homogeneity of the intensity between the different points of the scene.

10. The three-dimensional reconstruction method according to claim 6, wherein the image acquisition step comprises capturing a series of images of the scene by moving the maximum sharpness plane of the image acquisition device relative to the scene between each shot, the step for calculating a three-dimensional reconstruction comprising calculating the three-dimensional reconstruction of the scene, plane by plane, from the series of images.

11. A device for the three-dimensional reconstruction of a scene by image analysis, comprising:
an image acquisition device to capture images of the scene;
an analysis device to calculate a three-dimensional reconstruction of the scene from at least one image of the scene taken by the image acquisition device; and
a projection device to project a first light pattern and a second light pattern, which are complementary, on the examined scene, the first light pattern and the second light pattern being projected along separate projection axes forming a non-zero angle between the projection axes, so as to be superimposed while forming a uniform image with homogenous intensity in a projection plane which is substantially combined with a maximum sharpness plane of the image acquisition device, the analysis device being programmed to capture a series of images of the scene by moving the maximum sharpness plane and the projection plan of the image acquisition device relative to the scene between each shot, the analysis device being programmed to calculate a three-dimensional reconstruction of the scene, plane by plane, from the series of images, from a measurement of the variation of homogeneity of light intensity in each image.

* * * * *